United States Patent
Cole et al.

(10) Patent No.: US 8,341,195 B1
(45) Date of Patent: Dec. 25, 2012

(54) PLATFORM FOR MANAGING MEDIA ASSETS FOR MULTI-MODEL LICENSING OVER MULTI-LEVEL PRICING AND ASSET GROUPING

(75) Inventors: Mary Katherine Cole, Seattle, WA (US); Glen Arthur O'Connor, Renton, WA (US); Peter Christian Speyer, Seattle, WA (US)

(73) Assignee: Corbis Corporation, Seattle, WA (US)

( * ) Notice: Subject to any disclaimer, the term of this patent is extended or adjusted under 35 U.S.C. 154(b) by 319 days.

(21) Appl. No.: 11/867,617

(22) Filed: Oct. 4, 2007

(51) Int. Cl.
*G06F 17/30* (2006.01)
(52) U.S. Cl. ............... 707/805; 707/627; 705/51
(58) Field of Classification Search ............... 707/608, 707/705, 805, 821, 607, 627, 628, 632, 636, 707/915, 999.008, 999.102; 715/202, 700, 715/200, 730–733; 705/1, 1.1, 26, 300, 51, 705/52, 59, 61; 726/3
See application file for complete search history.

(56) References Cited

U.S. PATENT DOCUMENTS

| | | | |
|---|---|---|---|
| 4,337,483 A | 6/1982 | Guillou et al. |
| 5,201,047 A | 4/1993 | Maki et al. |
| 5,241,671 A | 8/1993 | Reed et al. |
| 5,251,316 A | 10/1993 | Anick et al. |
| 5,260,999 A | 11/1993 | Wyman |
| 5,263,158 A | 11/1993 | Janis |
| 5,317,507 A | 5/1994 | Gallant |
| 5,319,705 A | 6/1994 | Halter et al. |
| 5,325,298 A | 6/1994 | Gallant |
| 5,438,508 A | 8/1995 | Wyman |
| 5,442,778 A | 8/1995 | Pedersen et al. |
| 5,493,677 A | 2/1996 | Balogh et al. |
| 5,532,839 A | 7/1996 | Beikirch et al. |
| 5,553,143 A | 9/1996 | Ross et al. |
| 5,600,775 A | 2/1997 | King et al. |
| 5,629,980 A | 5/1997 | Stefik et al. |
| 5,642,502 A | 6/1997 | Driscoll |
| 5,675,819 A | 10/1997 | Schuetze |

(Continued)

FOREIGN PATENT DOCUMENTS
WO 02/19147 3/2002

OTHER PUBLICATIONS

Getty Images, License Information located at<http://creative.gettyimages.com/source/home/license.aspx>, visited Jul. 6, 2004, Copyright 1999-2006, 2 pages.

(Continued)

*Primary Examiner* — Greta Robinson
(74) *Attorney, Agent, or Firm* — Soquel Group LLC

(57) ABSTRACT

Managing content assets, such as images, video, and audio to facilitate filtering, searching, licensing, and editing associated attributes. Content assets are associated with multiple attributes, including licensing models, predefined value tiers, collections, and albums. Value tiers define varying ranges of price, resolution, or other qualities. Collections comprise groups of content assets within families, each specified by a license model and a value tier. Albums comprise groups of content assets that share a common topic, and albums have a predefined duration. An interface enables a user to filter by selecting any combination of the attributes, and to search the filtered content assets by keywords. Collection states and asset states determine which content assets are accessible for filtering and searching. An asset organizer automatically evaluates proposed edits to content asset attributes, to minimize edits that would unintentionally make content assets unavailable for licensing, and/or that would unintentionally change licensing terms.

13 Claims, 9 Drawing Sheets

U.S. PATENT DOCUMENTS

| | | | |
|---|---|---|---|
| 5,682,487 | A | 10/1997 | Thomson |
| 5,706,497 | A | 1/1998 | Takahashi et al. |
| 5,721,902 | A | 2/1998 | Schultz |
| 5,758,257 | A | 5/1998 | Herz et al. |
| 5,765,152 | A | 6/1998 | Erickson |
| 5,778,362 | A | 7/1998 | Deerwester et al. |
| 5,794,249 | A | 8/1998 | Orsolini et al. |
| 5,813,014 | A | 9/1998 | Gustman |
| 5,832,495 | A | 11/1998 | Gustman |
| 5,832,499 | A | 11/1998 | Gustman |
| 5,850,561 | A | 12/1998 | Church et al. |
| 5,864,845 | A | 1/1999 | Voorhees et al. |
| 5,875,446 | A | 2/1999 | Brown et al. |
| 5,903,892 | A | 5/1999 | Hoffert et al. |
| 5,938,724 | A | 8/1999 | Pommier et al. |
| 5,987,459 | A | 11/1999 | Swanson et al. |
| 6,006,221 | A | 12/1999 | Liddy et al. |
| 6,006,241 | A | 12/1999 | Purnaveja et al. |
| 6,012,068 | A | 1/2000 | Boezeman et al. |
| 6,038,333 | A | 3/2000 | Wang |
| 6,072,904 | A | 6/2000 | Desai et al. |
| 6,125,236 | A | 9/2000 | Nagaraj et al. |
| 6,138,119 | A | 10/2000 | Hall et al. |
| 6,243,713 | B1 | 6/2001 | Nelson et al. |
| 6,349,373 | B2 | 2/2002 | Sitka et al. |
| 6,385,596 | B1 | 5/2002 | Wiser et al. |
| 6,404,441 | B1 | 6/2002 | Chailleux |
| 6,523,028 | B1 | 2/2003 | DiDomizio et al. |
| 6,546,405 | B2 | 4/2003 | Gupta et al. |
| 6,574,609 | B1 | 6/2003 | Downs et al. |
| 6,574,622 | B1 | 6/2003 | Miyauchi et al. |
| 6,578,072 | B2 | 6/2003 | Watanabe et al. |
| 6,578,073 | B1 | 6/2003 | Starnes et al. |
| 6,581,055 | B1 | 6/2003 | Ziauddin et al. |
| 6,618,808 | B1 | 9/2003 | Johnson et al. |
| 6,735,583 | B1 | 5/2004 | Bjarnestam et al. |
| 6,834,130 | B1 | 12/2004 | Niikawa et al. |
| 6,868,192 | B2 | 3/2005 | Takiguchi |
| 6,871,009 | B1 | 3/2005 | Suzuki |
| 6,920,610 | B1 | 7/2005 | Lawton et al. |
| 6,944,340 | B1 | 9/2005 | Shah |
| 6,947,959 | B1 | 9/2005 | Gill |
| 7,092,953 | B1 | 8/2006 | Haynes |
| 7,099,849 | B1 | 8/2006 | Reeder et al. |
| 7,849,065 | B2 * | 12/2010 | Kamani et al. ............... 707/705 |
| 2002/0000998 | A1 | 1/2002 | Scott et al. |
| 2002/0077986 | A1 | 6/2002 | Kobata et al. |
| 2002/0082997 | A1 | 6/2002 | Kobata et al. |
| 2003/0085997 | A1 | 5/2003 | Takagi et al. |
| 2004/0205333 | A1 | 10/2004 | Bjorkengren |
| 2004/0267625 | A1 * | 12/2004 | Feng et al. ................. 705/26 |
| 2005/0114784 | A1 * | 5/2005 | Spring et al. ................. 715/762 |
| 2006/0064639 | A1 * | 3/2006 | Reid et al. .................... 715/700 |
| 2006/0069998 | A1 * | 3/2006 | Artman et al. ............... 715/721 |
| 2006/0242139 | A1 * | 10/2006 | Butterfield et al. ............... 707/5 |
| 2007/0118792 | A1 * | 5/2007 | O'Donnell et al. .......... 715/501.1 |
| 2007/0294100 | A1 * | 12/2007 | Chen et al. .......................... 705/1 |
| 2008/0209514 | A1 * | 8/2008 | L'Heureux et al. ............... 726/3 |
| 2008/0215985 | A1 * | 9/2008 | Batchelder et al. ........... 715/731 |
| 2008/0228507 | A1 * | 9/2008 | Larue et al. ....................... 705/1 |
| 2009/0254830 | A9 * | 10/2009 | Reid et al. ..................... 715/731 |

OTHER PUBLICATIONS

Harman et al., "Inverted Files," Information Retrieval: Data Structures & Algorithms, Prentilce Hall PTR, 1992, pp. 28-43.

Vellucci, Sherry L. "Metadata," Annual Review of Information Science and Technology, 1998, vol. 33, pp. 187-222.

Wool, Gregory "A Meditation on Metadata," E-Serials: Publishers, Libraries, Users and Standards, 1998, 10 pgs.

New Services Simplify Online Reprint Requests by Organization and Individuals; Agreement Marks 1st Content-Licensing Arrangment for UPI, Feb. 3, 2004, St. Paul, Minnesota, 3 pgs., http://www.icopyright.com/news/pr20040203.html, accessed May 8, 2004.

Media & Digital Asset Management v2.5, IntegritSistem, 3 pgs., http://www.integritsistem.com/mam/index.htm, accessed Aug. 3, 2004.

Final Cut Pro HD Gives You Powerful, Intuitive Content Management Tools That Let You Consolidate, Relink, Mark and Store your Digital Assets for Quick Retrieval, Apple Computer, Inc., 2 pgs., http://www.apple.com/finalcutpro/content.html, accessed Aug. 3, 2004.

What is a CareyDAM?, 2 pgs., http://www.dambigidea.com/indexinstantinfo.html, accessed Aug. 3, 2004.

DSMCi Chosen to be Lead Integrator for Discovery Communication's/Discovery Images' Digital Media Management System, DSMCi, Aug. 6, 1998, Beltsville, MD, 3 pgs., http://www.dsmci.com/press_080698_discovery.html, accessed Aug. 3, 2004.

Rada, Roy "Hypertext Writing and Document Reuse: The Role of a Semantic Net," Electronic Publishing, Aug. 1990, vol. 3(3), pp. 125-140.

Lohner, Joe "Machine Conceptualization of Natural Language Text," A Thesis Submitted to the Division of Research and Advanced Studies of the University of Cincinnati, 1995, pp. 1-315.

Zamir, Oren et al. "Fast and Intuitive Clustering of Web Documents," Department of Computer Science and Engineering, 1997, pp. 1-8.

Koller, Daphne et al. "Hierarchically Classifying Documents Using Very Few Words," pp. 1-16.

Buckley, Chris et al. "Using Clustering and SuperConcepts Within SMART: TREC 6," SabIR Research, Department of Computer Science, Ithaca, NY, 17 pgs.

Getty Images, Advanced Search, http://www.gettyimages.com/Search./Advanced Search.aspx, copyright 1999-2007, 2 pages.

Markova, S., Rightsline, Inc., KeiretsuNews, Apr. 2004, pp. 1-5, Issue 200404, Keiretsu Forum, Lafayette, California.

* cited by examiner

PLATFORM FOR MANAGING MEDIA ASSETS FOR MULTI-MODEL LICENSING OVER MULTI-LEVEL PRICING AND ASSET GROUPING

FIELD OF ART

The invention is directed to managing content assets, and more particularly, to associating content assets with attributes and to each other in multiple ways to facilitate content asset filtering, searching, licensing, and attribute editing.

BACKGROUND

Electronic images, video, audio, animation, text, and other content are widely communicated over electronic networks, such as the Internet. Electronic distribution and clearance services typically act as marketplaces or brokerages where owners contribute content and potential licensees search for and license content. Searching and maintaining large databases of content assets using conventional keyword search techniques and conventional database management techniques can be time consuming and require extensive computing power.

To improve efficiency, some content systems enable users to use a variety of criteria for filtering and organizing content assets. One criterion often used in the content licensing field, is a licensing model under which content is available for use. For example, a database may include stock photographs, each of which is available under one of a number of licensing models. Each licensing model typically indicates a relationship between one or more permitted uses and a corresponding type of pricing for licensing photos. For example one licensing model may provide a consistent price that is not dependent on a user specifying intended uses. Conversely, another licensing model may determine a price based on intended uses specified by the user. Under any licensing model, content owners (e.g., photographers) may impose customized restrictions on some uses of some content (sometimes referred to as contract restrictions). For example, some content owners may require that certain photographs not be used for advertising products that a content owner believes are undesirable. Content purchasers, such as advertising professionals, often choose to filter available photographs by a preferred licensing model, although searches can be performed across multiple licensing models.

Users can usually also select other filtering criteria, including a collection of content assets to which a desired content asset belongs (e.g., images by a certain photographer), a topic of content assets (e.g., celebrities), an image orientation (e.g., horizontal), a date range in which content assets were created, a resolution of content items, and a status of rights clearance (e.g., whether a person in a photograph has given permission to use his/her likeness). For some users, selecting numerous filtering criteria can be too confusing, and a simpler search system is desired, yet without sacrificing the flexibility of the numerous filtering criteria. Also desirable, is an option to filter based on various price levels or other value levels.

For content managers, maintaining changes to applied criteria can also be confusing and time consuming. For example, an image broker may wish to change the licensing model, pricing, and/or other criteria that are currently applied to a collection of images. However, changing each set of criteria for each image can be prohibitively time consuming and/or create a greater chance of error. Also, changing some criteria may depend on other criteria, or cause other criteria to change also. Checking criteria relationships for a large number of content assets can also prolong the time needed to make updates and produce errors. In addition, reorganizing content assets, such as moving content assets to different groups, can be time consuming and error prone. With a large number of groups, it is difficult for a content manager to keep track of the status and criteria of each source and destination group. If a destination group is inactive, or has some incompatible criteria, a content manager may accidentally move a content asset to a group that is not accessible to end users at that time. This may result in lost licenses of the content asset, mixing of incompatible content assets in a group, applying an incorrect value to content assets, and/or other errors. Embodiments of the invention are directed to these and other issues.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be implemented in different embodiments as methods, processes, processor readable mediums, systems, business methods, or devices. Accordingly, the present invention may take the form of an entirely hardware embodiment, an entirely software method embodiment or an embodiment combining software methods and hardware aspects. The following detailed description is, therefore, not to be taken in a limiting sense.

Briefly, the subject invention relates to associating media assets to each other in multiple ways to facilitate search and licensing. Aspects of the invention concern managing images or other media content, such as content that is published on one or more web sites for customers to search and license. Content items are associated in various ways, including by licensing model, pricing level, albums, and collections. The associations facilitate promotion of specific content items, facilitate user navigation and search, and other aspects as described herein below.

Illustrative Operating Environment

Figure 1:
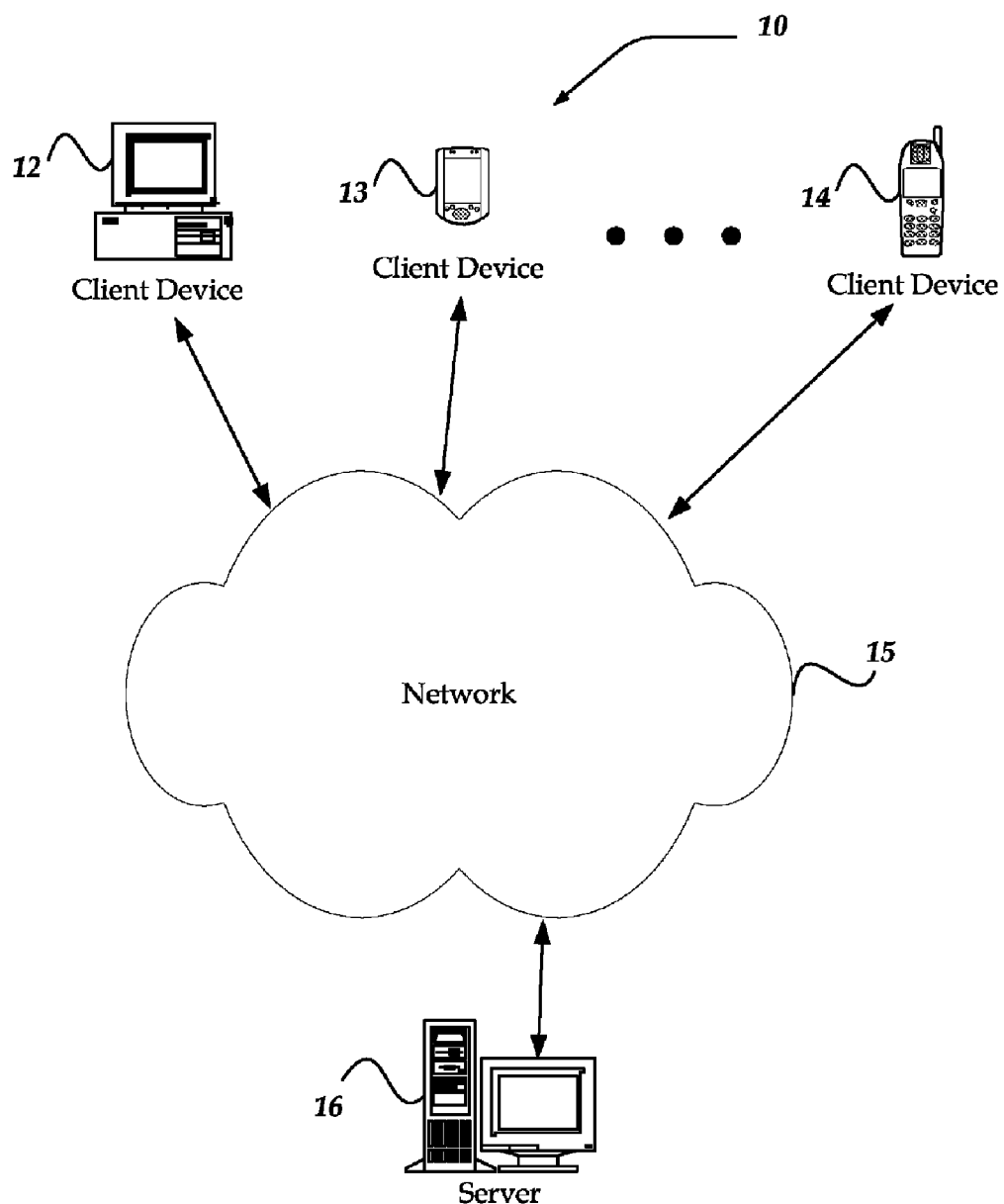
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, and a server 16. Network 15 is in communication with and enables communication between each of client devices 12-14, and server 16.

Client devices 12-14 may include virtually any computing device capable of receiving and sending a message over a network, such as network 15, to and from another computing device, such as server 16, each other, and the like. The set of such devices may include devices that are usually considered general purpose devices and typically connect using a wired communications medium such as personal computers, multiprocessor systems, microprocessor-based or programmable consumer electronics, network PCs, and the like. The set of such devices may also include mobile terminals that are usually considered more specialized devices and typically connect using a wireless communications medium such as cell phones, smart phones, pagers, walkie talkies, radio frequency (RF) devices, infrared (IR) devices, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium. The client devices may be used by content providers, content distributors, content purchasers, system administrators, and the like.

Each client device within client devices 12-14 includes a user interface that enables a user to control settings, and to instruct the client device to perform operations. Each client device also includes a communication interface that enables the client device to send and receive messages from another computing device employing the same or a different communication mode, including, but not limited to email, SMS, MMS, IM, internet relay chat (IRC), Mardam-Bey's internet relay chat (mIRC), Jabber, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 15 includes any communication method by which information may travel between client devices 12-14, and server 16. Network 15 is constructed for use with various communication protocols including transmission control protocol/internet protocol (TCP/IP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data. Such data can be communicated through communication media in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

One embodiment of a general purpose computing device, such as a computing device 20, is described in more detail below in conjunction with FIG. 2. Computing device 20 may be used as a server device and/or a client device. Briefly, computing device 20 may include any computing device capable of connecting to network 15 to enable a user to communicate with other client devices and/or server 16. Computing device 20 may include many more components than those shown. The components shown, however, are sufficient to disclose an illustrative embodiment for practicing the invention.

As shown in the figure, computing device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of computing device 20. The mass memory also stores an operating system 31 for controlling the operation of computing device 20. It will be appreciated that this component may include a general purpose operating system such as a version of Windows™, UNIX or LINUX™. The operating system may also include, or interface with a Java virtual machine module that enables control of hardware components and/or operating system operations via Java application programs.

Mass memory 24 further includes one or more data storage units 32, which can be utilized by computing device 20 to store, among other things, programs 34 and/or other data. Programs 34 may include computer executable instructions which can be executed by computing device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

Depending on the particular use of computing device 20, mass memory 24 stores a media asset organizer module 36 and a user interface module 38. Media asset organizer module 36 may include computer executable instructions, which may be run under control of operating system 31 to process content entry, content associations, content search, content navigation, content publication, and/or other client and/or server aspects of content management.

Figure 2:
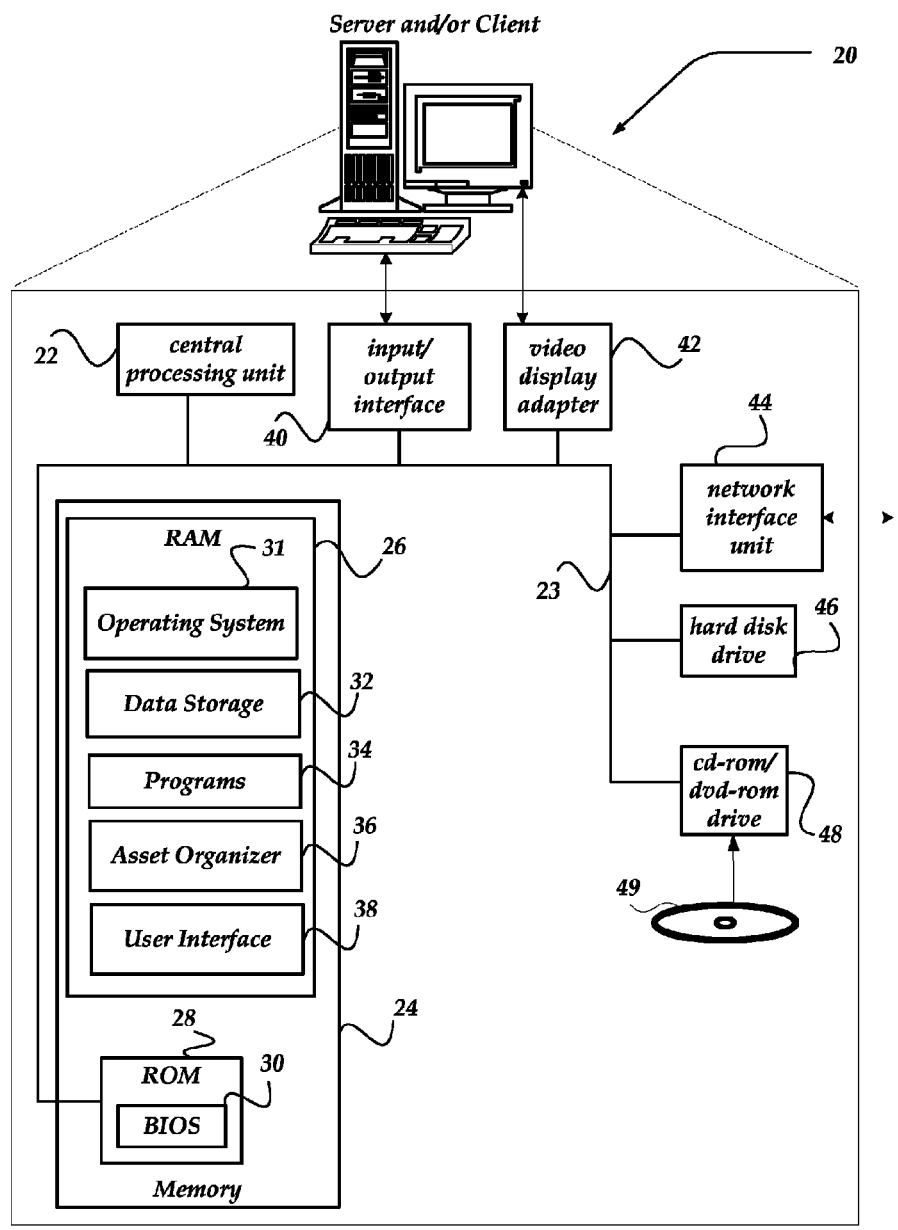
FIG. 2 shows one embodiment of a server and/or client device that may be included in a system implementing the invention.

Computing device 20 also includes an input/output interface 40 for communicating with input/output devices such as a keyboard, mouse, wheel, joy stick, rocker switches, keypad, printer, scanner, and/or other input devices not specifically shown in FIG. 2. A user of computing device 20 can use input/output devices to interact with a user interface that may be separate or integrated with operating system 31 and/or programs 34. Interaction with the user interface includes visual interaction via a display, and a video display adapter 42.

Computing device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 49, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 44, computing device 20 can communicate with a wide area network such as the Internet, a local area network, a wired telephone network, a cellular telephone network, or some other communications network, such as network 15 in FIG. 1. Network communication interface unit 44 is sometimes known as a transceiver, transceiving device, network interface card (NIC), and the like.

Illustrative Architecture & Processing

Figure 3:
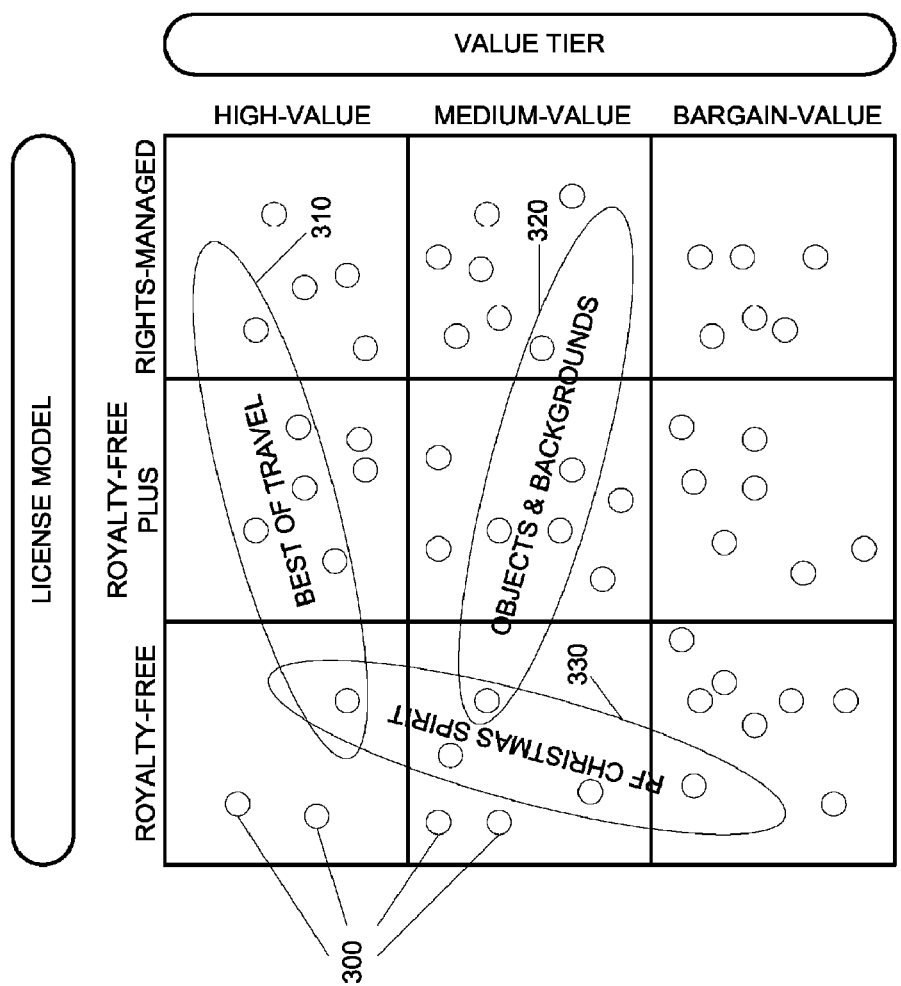
FIG. 3 is a diagram of a classification of images based on families and albums, in accordance with an embodiment of the present invention.
Figure 4:
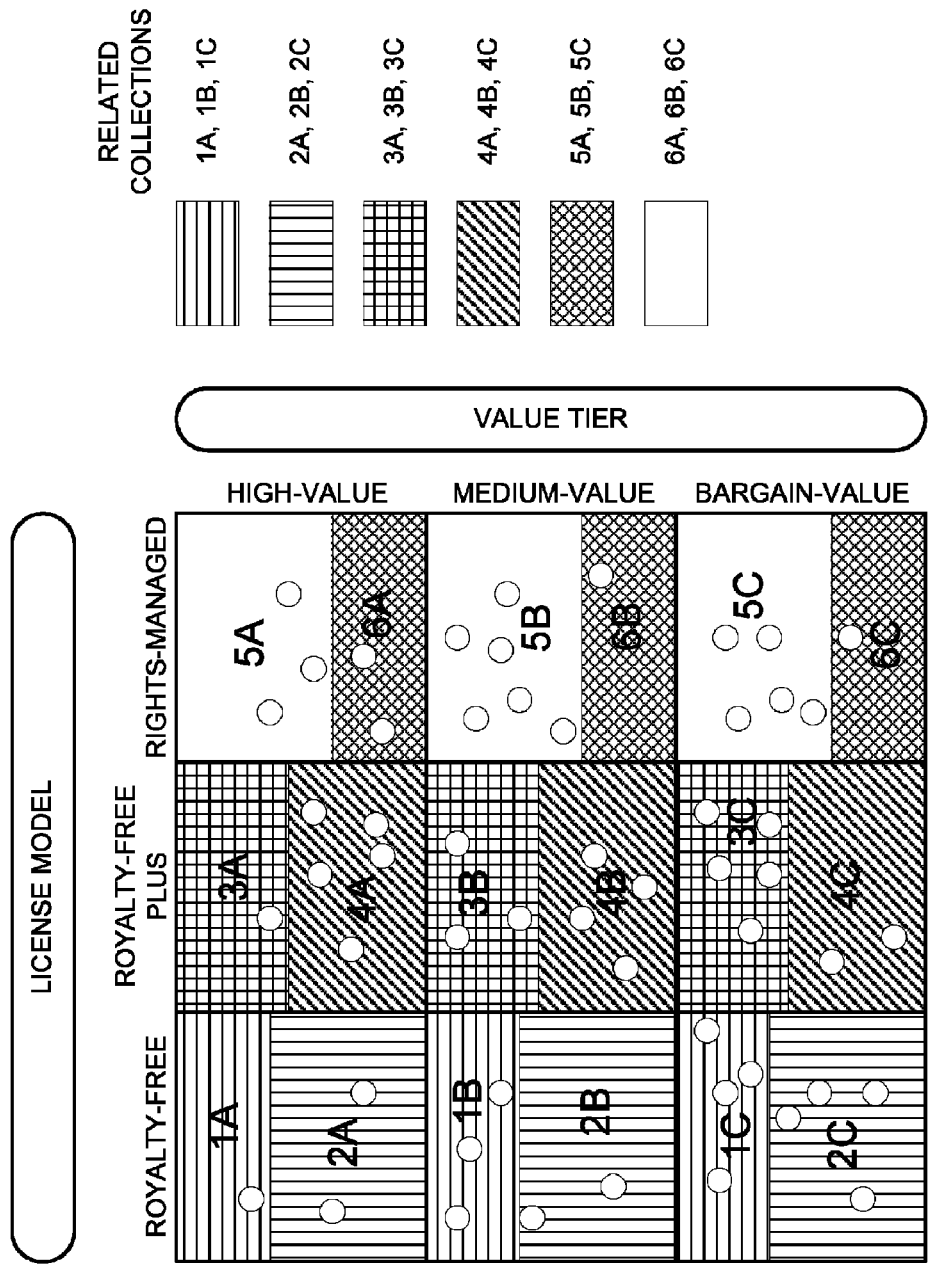
FIG. 4 is a diagram of a classification of images based on collections, in accordance with an embodiment of the present invention.

Reference is now made to FIG. 3, which is a simplified diagram of a classification matrix of content, based on licensing models, value tiers, and albums, in accordance with an embodiment of the present invention. As used in example embodiments herein, content generally refers to media assets, such as images, videos, audio, slide shows, animations and other forms of content. In an example embodiment, media assets are generally intended for commercial or editorial use. To simplify the following description of example embodiments, the media assets represented in FIGS. 3 and 4 are assumed to be images. Individual dots 300 in FIG. 3 represent images that may be licensed.

Shown in FIG. 3 are three columns corresponding to three licensing models; namely, (i) a "royalty-free" licensing model, (ii) a "royalty-free plus" licensing model, and (iii) a "rights-managed" licensing model. These columns are directed primarily at usage terms for licensing media assets out to licensees, such as advertising professionals, publishers, editors, or others who desire to use an image. Some uses may not be allowed under any license model due to contract restrictions imposed by media asset providers (e.g., photographers), media subjects (e.g., celebrities), or other rights holders.

The royalty-free (RF) licensing model generally provides unrestricted use of a media asset, and generally imposes a license fee that is not dependent on the particular intended use. For example, based on the selection of a particular electronic format/size, a fixed price is determined in advance for most every popular use of the media asset to be licensed. The royalty-free model can be relatively easy and inexpensive for a broker to administer, and relatively easy for customers to understand and to license media assets.

The royalty-free plus (RFP) licensing model is a somewhat more dynamic pricing model without requiring a lot more complexity to administer or use. This model derives a license fee based on a relatively limited number of predetermined usage categories that define how a media asset will be used, such as for print advertising and web advertising.

The rights-managed (RM) licensing model is a flexible pricing model that derives a license fee based on a relatively large number of usage conditions, such as an intended type of use, territory of use, start date, duration, industry, circulation size, type/size of an electronic format for the selected media asset, or the like. Each usage condition may have an associated sub-fee or weighting factor, such that the selected combination of usage conditions affects the total licensing fee that will be charged for media asset use. The rights-managed model enables customization of a particular price for specific conditions of use for selected content for each customer. This model can be more complex or expensive for a content broker to administer, and may be more cumbersome and time consuming for customers to use, but provides customization.

Also shown in FIG. 3 are three value tiers; namely, (i) a high value tier, (ii) a medium value tier, and (iii) a bargain value tier. In this embodiment, each licensing model is associated with the three value tiers. Each value tier generally corresponds to a value range for a licensing model, such as a price range. For example, in relation to the "royalty-free plus" licensing model, a value tier may encompass a price for using a media asset in print advertising, a different price for using a media asset in web advertising, another price for using a media asset on product packaging, and yet another price for editorial use. The prices may span a range, and each use may be different, but the broker may consider them to belong to the same value tier for other reasons, such as the current relevance of the content of each media asset to current news events. Alternatively, the broker may simply define the value tiers at equal price increments.

As another example, in relation to the "rights managed" licensing model, each value tier may include a plurality of prices corresponding to a plurality of geographic territories. In addition, or alternatively, each value tier may include a plurality of prices corresponding to a plurality of time periods. As a further example, each value tier may include a plurality of prices corresponding to circulation. In yet another example, each value tier may include a plurality of prices corresponding to resolution. In a further example, each value tier may include a plurality of prices corresponding to prominence of display. It will also be appreciated that each value tier may include prices for other factors.

Although the example figure shows horizontal lines dividing value tiers across all licensing models, the actual ranges may differ for each licensing model. For example, each licensing model may have different price ranges for each value tier. Accordingly, media asset brokers may separately establish dividing lines between value tiers for each licensing model, depending on the broker's value criteria, such as simple price divisions, characteristics of each licensing model, current market conditions, and/or other value attributes.

For example, value attributes and/or specific prices may be customized by intrinsic or extrinsic value factors. An intrinsic value factor can be based on information that is generally known to a creator or broker of a media asset, such as cost to obtain the media asset from a source; the source of the media asset, the author of the media asset, date of media asset creation, geographic locale of media asset creation, negotiated price to use the media asset for each of the plurality of predetermined categories of use; cost to manufacture the media asset in each format that can be made available to a customer; cost of media to provide the media asset; cost to store the media asset, or the like. An intrinsic value factor may also be based on proposed price information, such as a suggested licensing price, a minimum licensing price, a maximum licensing price, a volume discount, and/or other pricing information proposed by the media asset creator, current media asset owners(s), or the like.

Additionally, an extrinsic value factor can be based on information that is generally determined in a dynamic fashion based on market activity, such as current and/or past sales history; media assets added by users into online shopping carts; current or past promotions about a media asset; reviews; popularity; industry; current weather conditions; the current season; death and/or destruction of subject matter in a media asset; upcoming holidays; events; anniversaries; ranking; models; production; reproducibility; designation; use; renown of the media asset's author; renown of the media asset itself; search result hits; or the like. In one embodiment, an extrinsic value factor is referred to as "snappyness," which is generally based on reviewer ratings of a media asset, activity associated with a media asset, or other factors associated with the media asset. Media asset activity is generally based on one or more user behaviors. Examples of user behaviors include: users making the media asset a favorite, users selecting the media asset from a list of search results, users downloading the media asset, users sending the media asset (or links) to other users, users adding the media asset to a shopping cart, users proposing a new or alternate price, users licensing the media asset, or the like. Lack of user action may also affect media asset activity. For example, a long period of no user activity on a media asset indicates a temporal decay in media asset activity, and may affect the overall "snappyness" of that media asset. Snappyness may be provided to media asset providers, media asset users, administrators, or others for adjusting prices, determining a price category for a media asset, ranking a media asset, ranking media asset providers based on an aggregation of snappyness of each media asset from each provider, or other applications.

Further details of pricing parameters and licensing models are described in co-owned application U.S. Ser. No. 11/778, 578, filed on Jul. 16, 2007, entitled DETERMINING CONTENT PRICING FOR CATEGORIES OF USE BASED ON EXTRINSIC AND INTRINSIC FACTORS, the entire contents of which are hereby incorporated by reference. It will be appreciated by those skilled in the art that the three license models described above are merely representative of a large variety of license models that may be used with the present invention. It will also be appreciated that licensing models may be affected by other factors.

The three licensing models appear as three columns in the classification matrix depicted in FIG. 3, and the three value tiers appear as three rows of the classification matrix that cut across the columns. Again, it will be appreciated by those skilled in the art that the three value tiers described above are merely representative of a large variety of value tiers that may be used with the present invention.

Each square of the three-by-three partition in FIG. 3 represents a "family" of media assets. The term "family" is used herein to denote media assets that are related by a single licensing model and a single value tier. For example, "high value RM imagery" is a family of images that are licensed under a rights managed licensing model and have a high value. In one embodiment, each image belongs to one and only one family.

Media assets are also associated across families, according to one or more topics. The term "album" is used herein to denote a plurality of images that are related to a single theme, event, seasonality, need, or other topic. In one embodiment, an album includes images that are associated by subject matter topic. Shown in FIG. 3 are three albums; namely, (i) a "Best of Travel" album 310, (ii) an "Objects and Backgrounds" album 320, and (iii) an "RF Christmas Spirit" album 330. An image may belong to many albums, to one album, or to no albums. Again, it will be appreciated by those skilled in the art that these three albums described above are merely representative of a large variety of albums that may be used with the present invention.

Shown in TABLE I is a data structure that includes attributes of albums, in accordance with one embodiment of the present invention. It will be appreciated by those skilled in the art that other data structures may be implemented to embody the present invention, including inter alia entity-relationship diagrams, XML schemas, ontologies and relational database schemas.

TABLE I

| Album Attributes | |
|---|---|
| Attribute | Type/Values |
| ID | Key |
| Name | Text |
| Label | Image |
| Description | Text |
| Home Page | URL |
| Category | Text |
| Start Date | Date & Time |
| End Date | Date & Time |
| Album Display Sort Order | Number |
| Asset #1 | Asset ID |
| Asset #1 Display Order | Number |
| ... | ... |
| Asset #m | Asset ID |
| Asset #m Display Order | Number |

As shown in example TABLE I, each album has an ID, which is a unique identifier. An album is described by a label and a display description. Generally, the label and display description are localized for various languages.

In this embodiment, an album has a home page on the Internet, which may be used inter alia for e-mailing links to albums. An album has a topic category, such as "holiday" or "abstract images." An album has a start date and an end date. For an album's images to be available to end users for license, the current date must be between the album's start and end dates. The start and end dates may be edited. Thus, an album's expiration may be extended by changing its end date, and a previously available album may be made available again by changing its start and end dates. Albums may be assigned a display sort order, for use when a list of albums is displayed to a customer. The sort order may correspond to an alphabetical order, a creation date order, a quantity of images within each album, a selected priority order, or other sort order. Media assets within an album may also have a display order, and may have a lead asset specified.

Reference is now made to FIG. 4, which is a diagram of another classification of images based on collections, in accordance with an embodiment of the present invention. The term "collection" is used herein to denote a plurality of images within a single family. A collection also generally originates from a common source, such as a particular photographer, a particular owner, a particular institution, or the like. FIG. 4 includes the same licensing models and value tiers, and thus the same families as FIG. 3. FIG. 4 also includes a breakdown into collections and related collections. Shown in FIG. 4 are eighteen collections, 1A, 1B, 1C ... 6A, 6B, and 6C. Some collection may be related, such as a group of collections wherein the images of each collection are commonly owned. FIG. 4 shows examples of six groups 1-6 of related collections. This example figure illustrates each group of related collections with a different line pattern. For instance, a group 1 of related collections is illustrated with vertical lines. Accordingly, each collection, 1A, 1B, and 1C is illustrated with vertical lines. In this embodiment, each group of collections is associated with one licensing model, and each collection is associated with one value tier. For example, group 6 is associated with the rights managed license model. Group 6 is divided into three collections; namely, 6A for the high value tier, 6B for the medium value tier, and 6C for the bargain value tier. Also in this example embodiment, each image belongs to one and only one collection. In other words, each collection belongs to a single family, and each family is partitioned into one or more collections.

There need not be a collection in every family. Some families may not have any collections, and thus no images available in a certain value range for a certain licensing model. In another example, some related collections may not have any images that fall into one or more families due to value determinations for individual images, value threshold levels, restrictions on licensing model, or other factors. In another embodiment, there may be many more collections in a family. Multiple collections within a family may, or may not be related collections. For simplicity, only two collections are show in each family of FIG. 4. In one embodiment, each family may represent a range of price. In that case, each collection need not be limited to a particular sub-range of the family. In one embodiment, each collection can be illustrated by a free-form shape to encompass images from the same source with various prices that range throughout one value tier of one family. In the example of FIG. 4, each collection does not span an entire value range of a family. In this case, the collections may be ranked by value (e.g., by price) if desired.

Shown in TABLE II is a data structure that includes attributes of collections, in accordance with one embodiment of the present invention. It will be appreciated by those skilled in the art that other data structures may be implemented to embody the present invention, including inter alia entity-relationship diagrams, XML schemas, ontologies and relational database schemas.

TABLE II

| Collection Attributes | |
|---|---|
| Attribute | Type/Values |
| ID | Key |
| Name | Text |
| Description | Text |
| License Model | Royalty-Managed/Royalty-Free |
| Price Tier | Premium/Standard/Value |
| State | Inactive/Active/Retired |
| Asset #1 | Asset ID |
| ... | ... |
| Asset #n | Asset ID |

As shown in example TABLE II, each collection has an ID, which is a unique identifier. A collection is described by a label (e.g., 1A) and a description. Generally, the label name and description are localized for various languages. In this embodiment, a collection has a license model attribute. A group of related collections may have the same license model attribute. An individual collection belongs to a price tier. A collection has a state, which can be "inactive", "active" or "retired." The state may be independent for each collection, or may be selectively restricted to be the same for all related collections. A media asset also has a state, which can be "published", "unpublished" or "removed."

Shown in TABLE III is a data structure that includes attributes of images, in accordance with one embodiment of the present invention. It will be appreciated by those skilled in the art that other data structures may be implemented to embody the present invention, including inter alia entity-relationship diagrams, XML schemas, ontologies and relational database schemas.

TABLE III

| Media Assets | |
| --- | --- |
| Attribute | Values |
| ID | Key |
| Name | Text |
| Description | Text |
| State | Published/Unpublished/Removed |
| Collection | Collection ID |
| Album #1 | Album ID |
| ... | ... |
| Album #j | Album ID |

Figure 5:
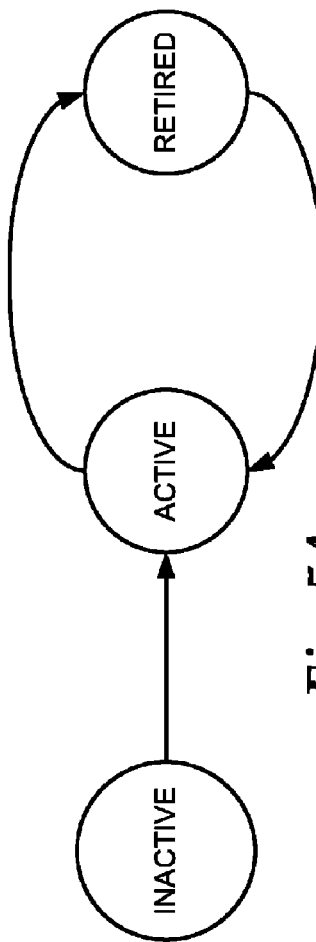
FIG. 5A is a diagram of valid collection state transitions, in accordance with an embodiment of the present invention.
FIG. 5B is a diagram of valid image and collection state combinations, in accordance with an embodiment of the present invention.

Reference is now made to FIG. 5A, which is a summary diagram of valid collection state transitions. FIG. 5B also summarizes combinations of media asset states and collection states, in accordance with an embodiment of the present invention. According to the embodiment shown in FIGS. 5A and 5B, the inactive state is used for new collections in which the media assets have not yet been published commercially (e.g., have never been made available for searching/licensing). A collection is generally inactive only once. Media assets within an inactive collection are not viewable or otherwise accessible to end users of a commercial web site. The active state is used for collections in which at least one media asset is published on a commercial web site and available to end users for searching/licensing. When a collection is active, all media assets within the collection that have a published state, are viewable to end users on the commercial web site. In this embodiment, an active collection may be retired, but cannot be made inactive. The retired state is used for collections in which at least one media asset was previously published on a commercial web site, but now all media assets of that collection are no longer published. In order to change the state of a collection to retired, all media assets in the collection have their state changed to removed. A retired collection may be made active again, but is generally not made inactive.

Figure 6:
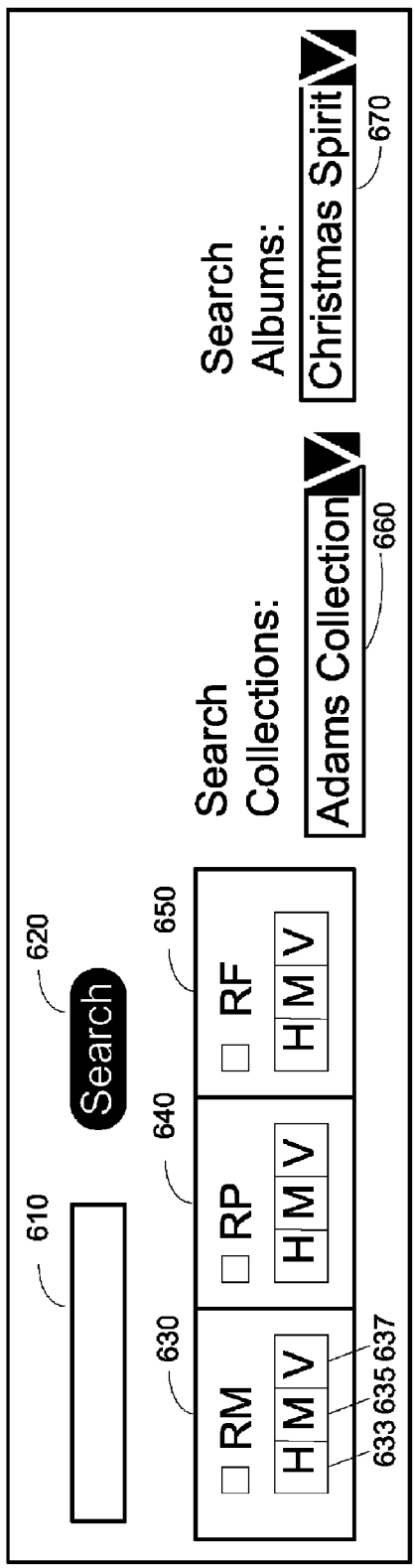
FIG. 6 is a simplified diagram of a user interface for searching for media assets, in accordance with an embodiment of the present invention.

In accordance with an embodiment of the present invention, published images associated with an active collection can be searched based on collections, families and albums. For example, a keyword search can be restricted to the family of "high value RM" images, or to "collection #4B" images. Reference is now made to FIG. 6, which is a simplified diagram of a user interface for searching for media assets in accordance with an embodiment of the present invention. Shown in FIG. 6 is a text box 610 for a user to enter key words, and a button 620 to initiate a search for media assets relating to the key words. The user may restrict the search to one or more license models, by clicking on one or more checkboxes, such as a rights-managed (RM) license model checkbox 630, a royalty-plus (RP) license model checkbox 640, and/or a royalty-free (RF) license model checkbox 650. In addition, or alternatively, the user may restrict his search to one or more value tiers, by clicking on buttons for high-value, medium-value, or bargain-value pricing, such as high-value (H) button 633, medium-value (M) button 635, and bargain-value (V) button 637 (where "V" indicates "value" level images). Selective assignment or filtering based on value tiers is generally not currently known for licensing systems, such as online media asset brokerage systems.

By selecting a license model and a value tier, the user restricts his search to a designated family. In an embodiment of the present invention, when the user designates a family for his search, the relevant collections within the designated family are identified and listed in a pull-down menu 660. Similarly, the relevant albums that overlap with the designated family are identified and listed in a pull-down menu 670. This feature determines the relevant collections and albums, for the license model(s) and the price range(s) selected by a user.

The user may then restrict the search to a specific collection by selecting the desired collection via pull-down menu 660. He may also or alternatively restrict the search to a specific album, by selecting the desired album via pull-down menu 670. Such search controls enable the user to narrow the search to a desired license model and value tier.

For example, referring to FIGS. 3 and 4, if the user designates the royalty-free (RF) medium value (M) family (corresponding to unlimited use of medium value images), the pull-down menu 660 includes collections 1B and 2B (one of which may be labeled "Adams Collection"), and pull-down menu 670 includes the albums labeled "RF Christmas Spirit" and "Objects and Backgrounds." None of the other collections and albums are relevant to the designated RF-M family. By selecting the "RF Christmas Spirit" album, the user narrows the search to medium-valued media assets within the selected album. By selecting both the "RF Christmas Spirit" album and collection 2B, the user narrows the search to assets from collection 2B within the album.

It will thus be appreciated by those skilled in the art that organization of media assets by family, collection, and album enables users to select filtering parameters that speed searching and navigation of large databases of assets. The value tier parameter also enables users narrow the selectable collections and perform more efficient searches for assets that are in the categories and the price ranges that users are looking for. The user interface is also compact and intuitive, yet provides multiple filter parameters to control searching. Similarly, arrangement of media assets in terms of families, collections, and albums also enables asset owners and asset brokers to more precisely segment assets to more efficiently promote, market, and price their assets in a selective and dynamic way.

Figure 7:
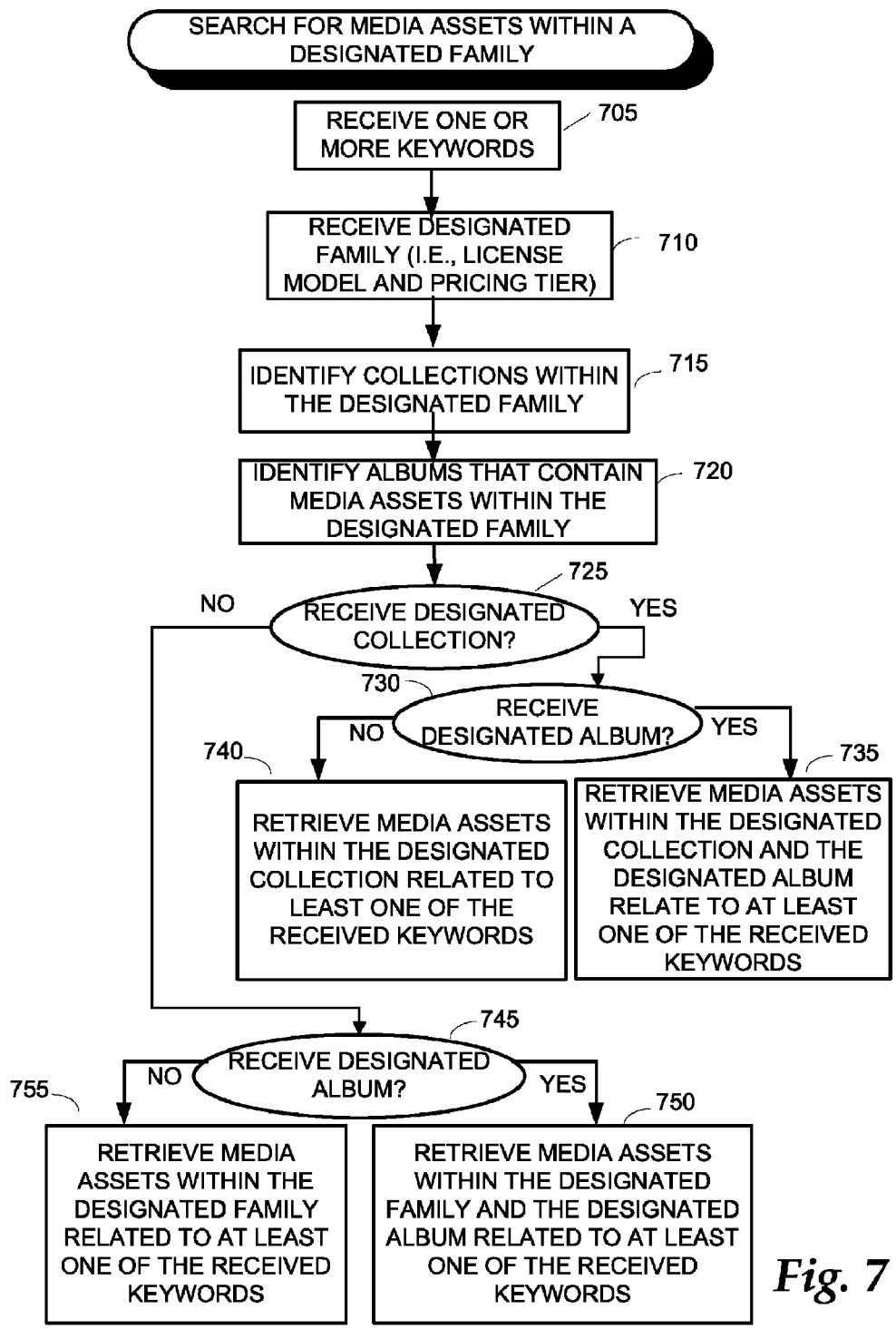
FIG. 7 is a simplified flowchart of a method for filtering a keyword search for media assets, in accordance with an embodiment of the present invention.

Reference is now made to FIG. 7, which is a simplified flowchart of a method for filtering a keyword search for media assets, in accordance with an embodiment of the present invention. The media assets are generally catalogued with associated keywords. As shown in FIG. 7, at step 705 one or more search keywords are received from a user. At step 710, one or more families are determined from a user's selection of one or more license models and one or more value tiers. For simplicity, this example assumes that the user selects one license model and one value tier, so that only one family is determined. At step 715 collections are identified that are associated with the determined family. The identified collections are the ones that are relevant to the determined family. At step 720 albums are identified that include media assets within the determined family. The identified albums are the ones that are relevant to the determined family. As such, the user may review lists of the collections and albums that correspond to the selected license model and value tier.

The user may narrow the search by selecting one or more of the identified collections, or one or more of the identified albums, or both. At step 725 a determination is made whether the user has designated one of the identified collections. If so, then at step 730 a further determination is made whether the user has designated one of the identified albums. If so, then at step 735 the user's keyword search is performed on the narrowed group of media assets, and search results are retrieved. The search results include media assets related to at least one of the user's keywords, and that belong to both the designated collection and the designated album. Otherwise, if it is determined at step 730 that the user has not designated one of the identified albums, then at step 740 search results are retrieved, which include media assets related to at least one of the user's keywords, and that belong to the designated collection.

If it is determined at step 725 that the user has not designated one of the identified collections, then at step 745 a further determination is made whether the user has designated one of the identified albums. If so, then at step 750 search results are retrieved, which include media assets related to at least one of the user's keywords, and that belong to both the determined family and the designated album. In this case, the search results include images from each collection in the family that includes at least one image in the selected album that matches the user's keywords. Otherwise, if it is determined at step 745 that the user has not designated one of the identified albums, then at step 755 search results are retrieved, which include media assets related to at least one of the user's keywords, and that belong to the determined family.

Figure 8:
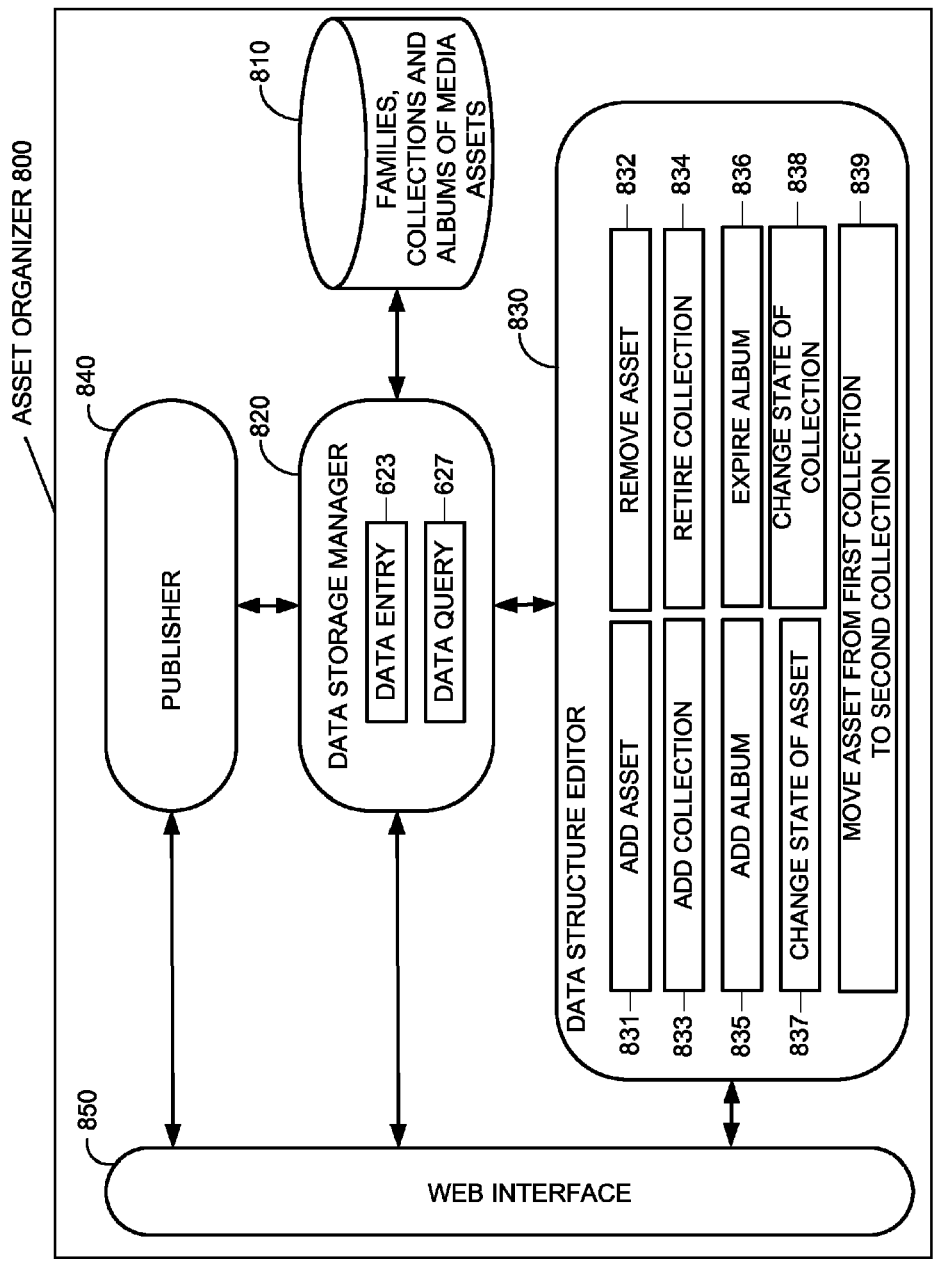
FIG. 8 is a simplified block diagram of a media asset organizer, in accordance with an embodiment of the present invention.

Reference is now made to FIG. 8, which is a simplified block diagram of a media asset organizer 800 (sometimes referred to herein as simply the asset organizer), in accordance with an embodiment of the present invention. Media asset organizer 800 is an embodiment of media asset organizer 36. Shown in FIG. 8 is a data storage 810 for storing media assets and for organizing them according to a data structure in terms of families, collections and albums, as described hereinabove. Data entry and retrieval for data storage 810 is managed by data storage manager 820. Data storage manager 820 includes inter alia a module 823 for data entry, and a module 827 for data query and retrieval. Data storage manager 820 is able to directly read and write to data storage 810.

The data structure governing data storage 810 may be edited by a data structure editor 830. Data structure editor 830 provides functionality for dynamically updating the data structure, and includes inter alia modules 831 and 832 for adding and removing media assets, respectively, modules 833 and 834 for adding and retiring collections, respectively, modules 835 and 836 for adding and expiring albums, respectively, modules 837 and 838 for changing states of assets and collections, respectively, and module 839 for evaluating and performing a requested move of an asset from a first collection to a second collection.

According to one implementation of the present invention as described in TABLES I-III hereinabove, media assets are removed by changing their states to "removed;" collections are retired by changing their states to "retired;" and albums expire based on their end dates.

It will be appreciated by those skilled in the art that modules 831-838 are representative of data transaction modules and, in specific embodiments of the present invention, additional modules or other modules may be implemented.

Figure 9:
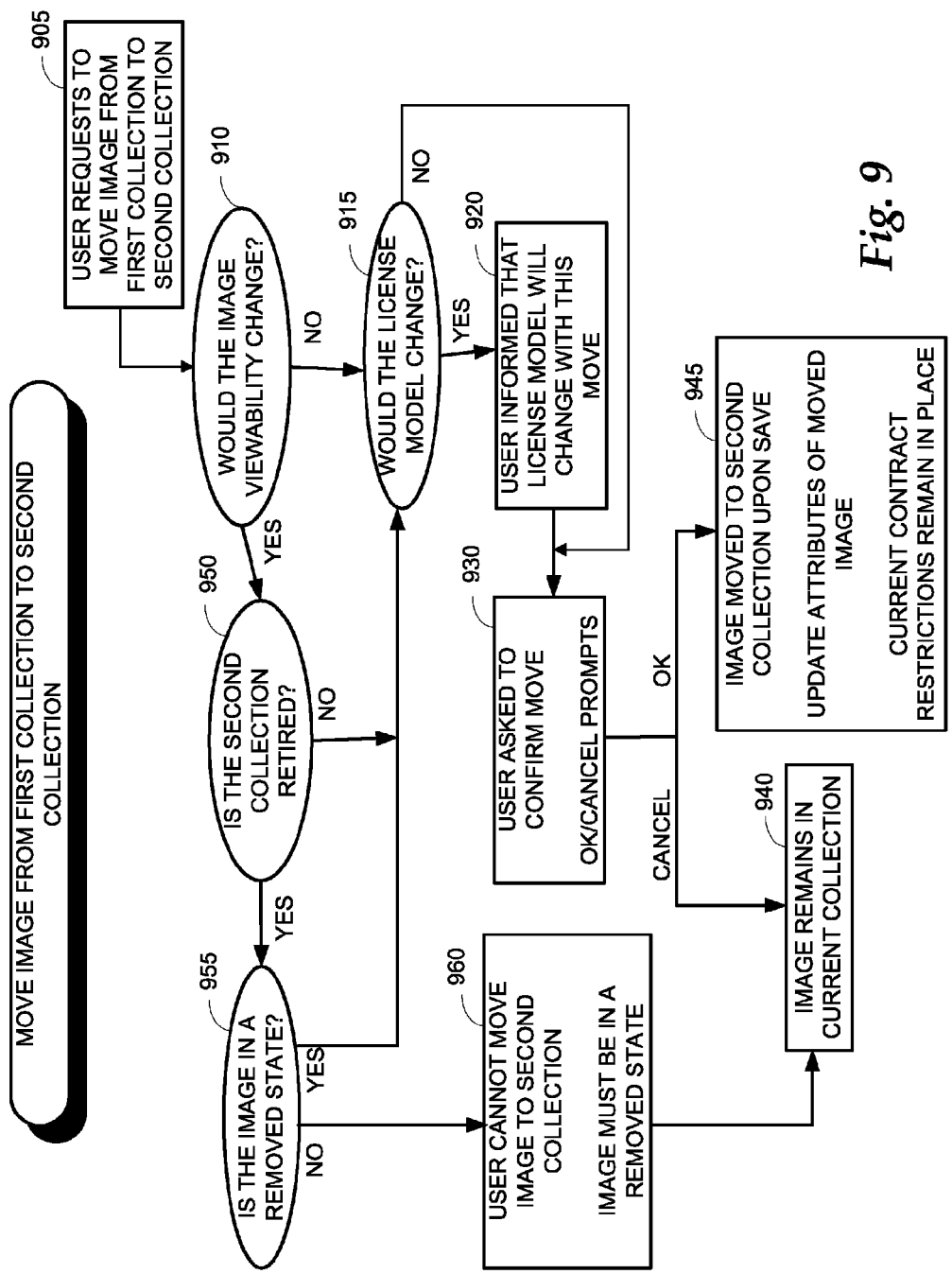
FIG. 9 is a simplified flowchart of a method for evaluating a requested move of an image from a first collection to a second collection, in accordance with an embodiment of the present invention.

Regarding module 839, reference is now made to FIG. 9, which is a simplified flowchart of a method for evaluating a requested move of an image from a first collection to a second collection, in accordance with an embodiment of the present invention. For example, in response to a current news event, an image broker may wish to move a related image from a collection in a lower value tier to a collection in a higher value tier. However, certain moves among collections may remove the image from view/access by end users. The image broker may intend this in some circumstances, but it is desirable to prevent this from happening accidentally. It can be difficult for an image broker to keep track of the various states of images and categories within all of the families. To reduce accidental errors, a proposed move is evaluated. At step 905 the media asset organizer of FIG. 8 receives a request to move a designated image from a first collection to a second collection.

At a decision step 910, the asset organizer determines whether the viewability of the designated image would change. As seen in FIG. 5B, an image is viewable if it is currently in a "published" state, and if the image is in a collection that is currently in an active state. An image is not viewable if the image is currently in an "unpublished" state, or is in a collection that is currently in an "inactive" state. In one example move, the image broker may request to move the designated image from an inactive first collection to an inactive second collection. For instance, the image broker may have just received new images and may be sorting them into new (inactive) collections. In that case, a moved image would still not be viewable, so there is little or no risk that the requested move would accidentally remove the designated image from view or other access by end users.

Conversely, the image broker may request to move an image from an active first collection to an active second collection. The state of the image would also stay the same, so the viewability of the image would stay the same. In any case, if the requested move would not change the image viewability, there is little risk in allowing the requested move from the first collection to the second collection.

However, before the requested move is performed, the asset organizer also checks the affect of the requested move on the licensing model at step 915; i.e., whether the second collection has a different license model than the first collection. The requested move may change the licensing model, which would change the licensing terms for the designated image. If the license model would not change, the licensing terms would remain the same, so the image broker need not be concerned about a possible change to the licensing model. However, if the asset organizer determines that the requested move would cause the license model of the designated image to change, the asset organizer informs the user of the possible license model change, at step 920. This prompt helps to ensure that the image broker is aware of the possible change in licensing terms, and enables the image broker to decide whether a change in the licensing model is really desired.

In either case, at step 930, the asset organizer prompts the user to choose between canceling the move and performing the move. If the image broker cancels the move, then at step 940 the asset manager cancels the move request and the image remains in its current collection (i.e., the first collection). If the image broker OKs the move, then at step 945 the asset organizer moves the designated image to the second collection, upon a "save" confirmation from the image broker. The asset organizer accordingly updates the collection attributes of the moved image to those attributes of the second collection. In the case of a changed license model, the update includes changing the license model attribute for the moved image. However, the current contract restrictions for the image remain in place.

Returning attention back to step 910, if the asset organizer determines that the viewability of the designated image would change, then processing proceeds to step 950, where the asset organizer determines whether the second collection is currently in a retired state. If the image broker did not request to move the designated image to a retired second collection, then the move would not accidentally remove the image from access by end users. In that case, the move is allowable. However, as above, processing proceeds to step 915 to determine whether the requested move would change the licensing model.

Conversely, if the image broker requested to move the designated image to a second collection that is in a retired state, the move might not be allowable, because the designated image may not be in the proper state for transfer to a retired collection. Accordingly, the asset organizer evaluates the state of the designated image at step 955. Specifically, the asset organizer determines whether the designated image is currently in a removed state. It is noted from FIG. 5 hereinabove, that in this embodiment, all images in a collection must be in a removed state before the collection can be retired. This requirement prevents some published images from accidentally being removed if the image broker attempts to retire the corresponding collection. If the designated image is already in a removed state, moving the designated image to another collection that is in the retired state will not accidentally remove the image from access by end users. In that case, the move is allowable.

Note that in the event that the image broker requests to move the designated image from an inactive first collection to a retired second collection, this move will not be allowed in this embodiment of the invention, because a collection can not be retired if the collection has never been active. In other embodiments, this move may be allowed. For instance, the image broker may believe that a newly received image is related to a second collection of images that were already retired, so the image broker may want to move that designated image directly from an inactive collection to the retired collection. In one embodiment, the designated image would still be considered not viewable as a result of the move, so the move may be allowed. In another embodiment, the requested move may not be allowed until the designated image is first published and made available to end users in an active collection, before the designated image can be moved to a retired collection.

In the embodiment of FIG. 9, if the requested move is to a retired collection, and if the designated image is not currently in a removed state, the image broker may have mistakenly requested that a viewable image be moved to a retired collection. Accordingly, at step 960, the asset organizer informs the image broker that the image cannot be moved to the second collection in its current state. The image broker should first change the image state to "removed." Processing then proceeds to step 940 and the image remains in the first collection. In another embodiment, the asset organizer may provide an instruction message and/or an option to change the image state to "removed." In addition, or alternatively, the asset organizer may provide a warning message and an option to cancel the move, or to override the warning and proceed with the move. This may automatically change the image state to "removed."

In reading the above description, persons skilled in the art will realize that there are many apparent variations that can be applied to the methods and systems described. In one embodiment, similar processing is performed for moving assets to different albums, if it is desired to prevent assets from being moved to expired albums. Thus it may be appreciated that the present invention is advantageous for use with general brokerage systems and services that license assets, in addition to media asset licensing, including inter alia brokering of equipment licenses, real estate rentals, business services, and the like.

What is claimed as new and desired to be protected by Letters Patent is:

1. A computer implemented method for managing content assets for licensing, comprising:
   storing, by a server computer, a plurality of content assets;
   assigning, by a server computer, each content asset to a collection, wherein a collection includes a plurality of content assets within a single element of a classification matrix, wherein each column of a classification matrix corresponds to one of a plurality of license models and each row of a classification matrix corresponds to one of a plurality of value tiers, wherein a license model specifies a set of usage restrictions on a license to a content asset and a value tier designates a relative level of quality and corresponds to a plurality of license prices, wherein license prices for higher quality value tiers are generally higher than license prices for relatively lower quality value tiers;
   receiving by the server computer, from a client computer, a specification of a usage requirement and a price range;
   identifying, by the server computer, the collections associated with the specified usage requirement and price range; and
   providing, by the server computer, to the client interface a list of the identified collections.

2. The method of claim 1, wherein the content assets have keywords associated therewith, the method further comprising:
   receiving, from the client computer, at least one keyword; and
   determining, by the server computer, which of the plurality of content assets are associated with the at least one received keyword and with the specified usage requirement and price range.

3. The method of claim 1, wherein the content assets have keywords associated therewith, the method further comprising:
   receiving from the client computer at least one keyword and a selection of at least one collection from the identified collections;
   determining, by the server computer which of the plurality of content assets are associated with the at least one received keyword and with the selected at least one collection; and
   providing, to the client computer, a list of the determined content assets.

4. A nontransitory computer readable media storing machine instructions that instruct a processor to perform the operations of claim 1.

5. A server for managing content assets for licensing, comprising:
   a processor;
   a communication interface in communication with the processor;
   a data storage for storing content assets; and
   a memory in communication with the processor for storing a instructions, which when executed by the processor, cause the processor to perform a plurality of operations, including:
     storing a plurality of content assets in the data storage;
     assigning each content asset to a collection, wherein a collection includes a plurality of content assets within a single element of a classification matrix, wherein each column of a classification matrix corresponds to one of a plurality of license models and each row of a classification matrix corresponds to one of a plurality of pricing tiers, wherein a license model specifies a set of usage restrictions on a license to a content asset and a value tier designates a relative level of quality and corresponds to a plurality of license prices, wherein license prices for higher quality value tiers are generally higher than license prices for relatively lower quality value tiers;
     receiving, from a client computer, a specification of a usage requirement and a price range;
     identifying the collections associated with the specified usage requirement and price range; and providing to the client computer a list of the identified collections.

6. The server of claim 5, wherein the content assets have keywords associated therewith, and wherein the instructions further cause the processor perform the operations of:
receiving, from the client computer, at least one keyword;
receiving, from the client computer, a selection of at least one collection from the identified collections;
determining which of the plurality of content assets are associated with the at least one received keyword and with the selected at least one collection; and
providing, to the client computer, a list of the determined content assets.

7. A computer implemented method of managing content assets for licensing, comprising:
storing by a server computer a plurality of content assets;
assigning, by a server computer, each content asset to a collection, wherein a collection includes a plurality of content assets within a single element of a classification matrix, wherein each column of a classification matrix corresponds to one of a plurality of license models and each row of a classification matrix corresponds to one of a plurality of value tiers, wherein a license model specifies a set of usage restrictions on a license to a content asset and a value tier designates a relative level of quality and corresponds to a plurality of license prices, wherein license prices for higher quality value tiers are generally higher than license prices for relatively lower quality value tiers;
receiving from a user interface, running on a first client computer, a request for pricing to license a designated content asset, wherein the designated content asset is associated with a first collection;
providing, by the server computer, to the user interface running on the first client computer the plurality of license prices that correspond to the value tier associated with the collection to which the designated content asset is assigned;
receiving from an asset organizer interface, running on a second client computer, a request to move the designated content asset from the first collection to a second collection;
reassigning, by the server computer, the designated content asset from the first collection to the second collection wherein the second collection corresponds to a different row of the classification matrix than the first collection;
receiving from a user interface, running on a third client computer, a request for pricing to license the designated content asset; and
providing, by the server computer, to the user interface running on the third client computer the plurality of license prices that correspond to the value tier that corresponds to the second collection.

8. The method of claim 7, wherein each of the plurality of license prices within a value tier corresponds to a different usage restriction, selected from a category of usage restrictions, wherein a usage restriction is a condition that is included in a license to use the designated content asset.

9. The method of claim 8, wherein the category of usage restrictions is the resolution of the content asset to be provided to the user upon licensing the content asset.

10. The method of claim 8, wherein the category of usage restrictions is the geographic territory for which the content asset is licensed.

11. The method of claim 8, wherein the category of usage restrictions is the advertising media for which the content asset is licensed, said category including at least Web media and print media.

12. The method of claim 8, wherein the category of usage restrictions is the time period for which the content asset is licensed.

13. The method of claim 7, wherein a collection is assigned one of a plurality of collection states and wherein the state assigned to a collection determines if content assets assigned to the collection may be provided to a user interface for viewing by a user, further comprising:
determining, by the server computer, whether the requested move would prevent the selected content asset from being provided to a user interface for viewing by a user, wherein the determination is based on the collection state of the second collection; and
issuing an electronic notification to the asset organizer interface that completion of the move would prevent the selected content asset from being provided to a user interface for viewing by a user.

* * * * *